N. WARING.
PLANTER.
APPLICATION FILED NOV. 12, 1909.

1,001,102.

Patented Aug. 22, 1911.
5 SHEETS—SHEET 4.

Inventor
Nicholas Waring

Witnesses
Walter B. Payne
Russell B. Griffith

UNITED STATES PATENT OFFICE.

NICHOLAS WARING, OF ROCHESTER, NEW YORK.

PLANTER.

1,001,102.    Specification of Letters Patent.    Patented Aug. 22, 1911.

Application filed November 12, 1909. Serial No. 527,657.

*To all whom it may concern:*

Be it known that I, NICHOLAS WARING, of Rochester, in the county of Monroe and State of New York, have invented certain new and useful Improvements in Planters; and I do hereby declare the following to be a full, clear, and exact description of the same, reference being had to the accompanying drawings, forming a part of this specification, and to the reference-numerals marked thereon.

My present invention relates to agricultural implements and more particularly to planting machinery and it has for one of its objects to provide a device of this nature which will be simple in construction and operation and sure and regular in its working.

Another object is to produce a machine particularly adapted to the planting of potatoes wherein the seed will be distributed with practically the precision of a force feed apparatus.

The improvements are directed in part toward rendering the operation of the working parts of the planter open and under the direct supervision of the driver or attendant thereby giving him opportunity to conveniently fill in the skippages, if any, and insure an even and regular sowing of the seed.

To these and other ends the invention consists in certain improvements and combinations of parts all as will be hereinafter more fully described, the novel features being pointed out in the claims at the end of the specification.

In the drawings: Fig. 11 is a view corresponding to Fig. 6 but showing the various parts in different positions. Fig. 12 is an elevation of the signal provided to give notice of a skippage in the operation of the machine and, Fig. 13 is a top plan view thereof.

Similar reference numerals throughout the figures indicate the same parts.

The machine illustrated as the present embodiment of my invention is, as before indicated, a potato planter of the vehicle type and referring first to the general features thereof, 1 indicates the main frame having the draft tongue 2 and supported by an axle shaft 3 on the ground wheels 4, a seat 5 being provided if desired for the driver or attendant. Hung from the frame 1 is a furrow opener 6 traveling in advance of a plow point 7 in rear of which are the usual coverers 8 under control of the lever 9 arranged adjacent the seat 5.

Preferably at the forward end of the frame 1 is arranged a relatively large main hopper 10 of any suitable design into which the supply of seed, whether chopped or whole, is emptied, and their course of travel from this hopper to the furrow will first be briefly indicated before proceeding with a detail description of the various mechanisms that operate to this end.

An endless conveyer 11 removes the seed at a given rate from the hopper 10 and discharges them into an auxiliary hopper 12 arranged adjacent thereto which latter contains a vibrating member 13 in the bottom thereof that feeds the seed thence into a receiving pocket or holder 14. A pair of intermittently reciprocating and rotating impaling forks 43 transfer the contents of the holder 14, one seed at a time, and deposit them in the successive peripheral pockets 16 of a rotary distributer 17 by which they are carried a complete revolution under the eye of the attendant before being discharged through an opening 18 in the table 19 upon which the distributer revolves. This discharge opening 18 constitutes, in the present instance, the upper end of a chute 20 that delivers the seed in rear of the plow point 7. As it takes some time for a seed in one of the pockets 16 to make a complete revolution, the attendant has ample opportunity to fill any one of the said pockets by hand before it reaches the discharge opening in case the carrier forks have failed to fill it and thereby prevent a break in the regularity of the row being sowed. Also, through my invention, a signal is provided which calls attention to the fact whenever a carrier fork fails to present a seed upon its arrival at the distributer.

Figure 1:
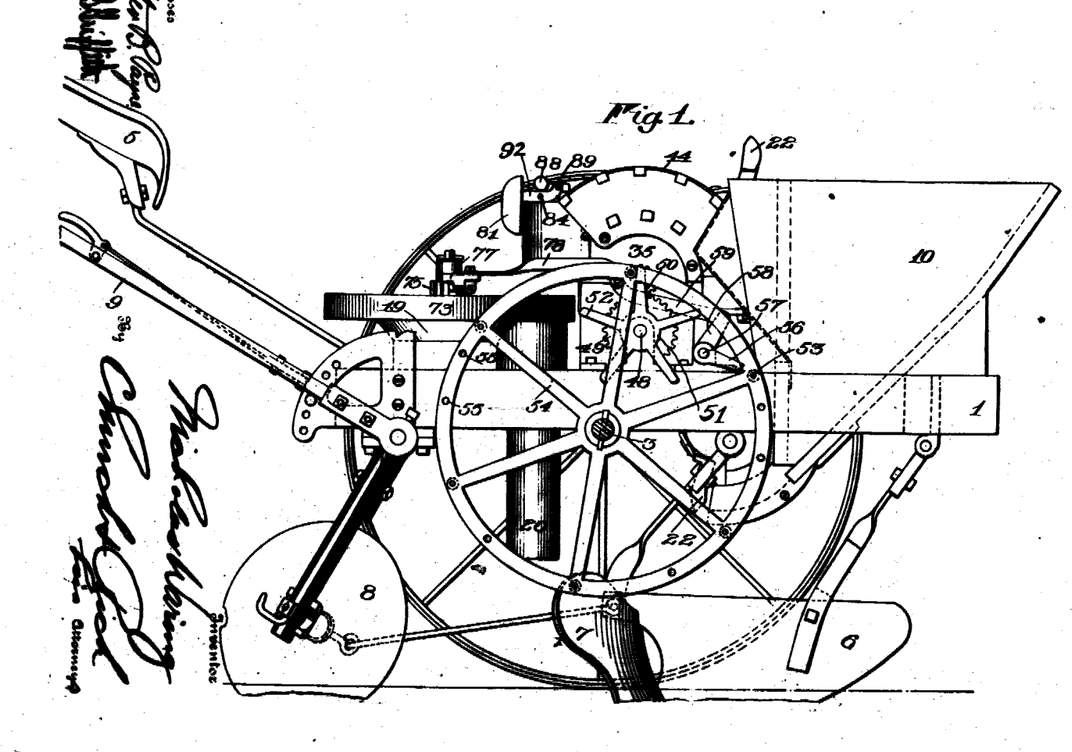
Figure 1 is a side elevation partly in section on the line 1—1 of Fig. 2 of a potato planter constructed in accordance with and illustrating one embodiment of my invention.
Figure 2:
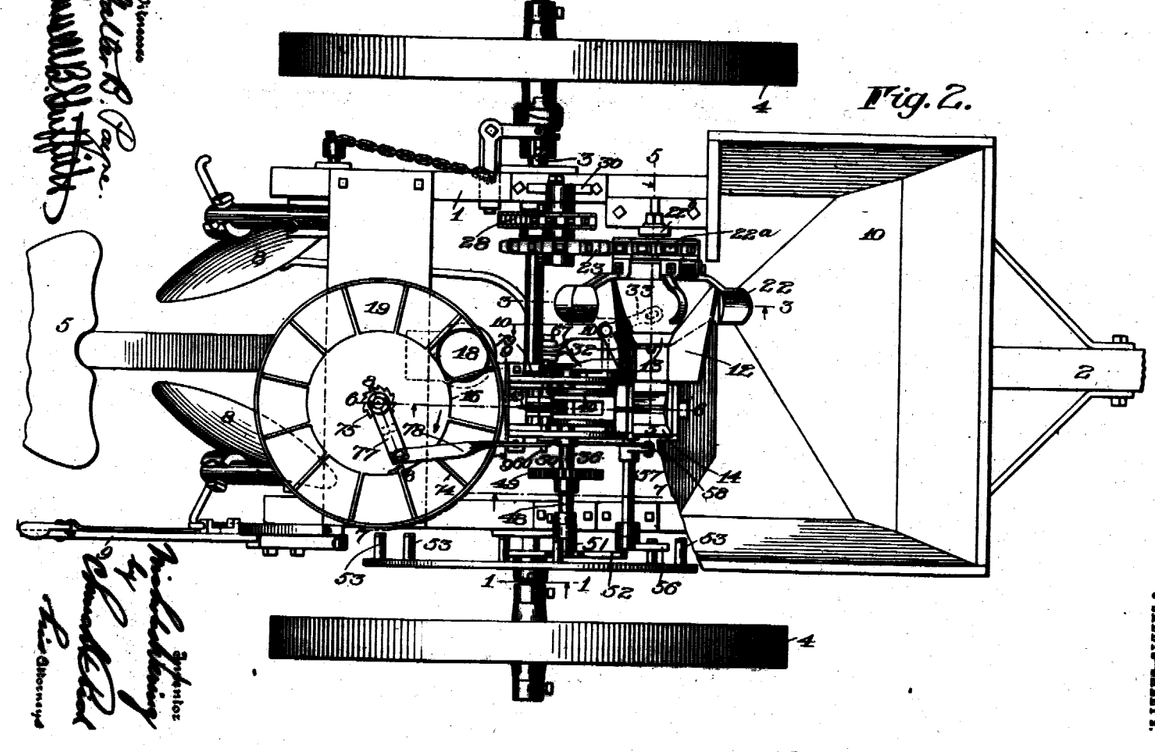
Fig. 2 is a top plan view thereof, the ejector casing of the carrier being removed.
Figures 3, 4:
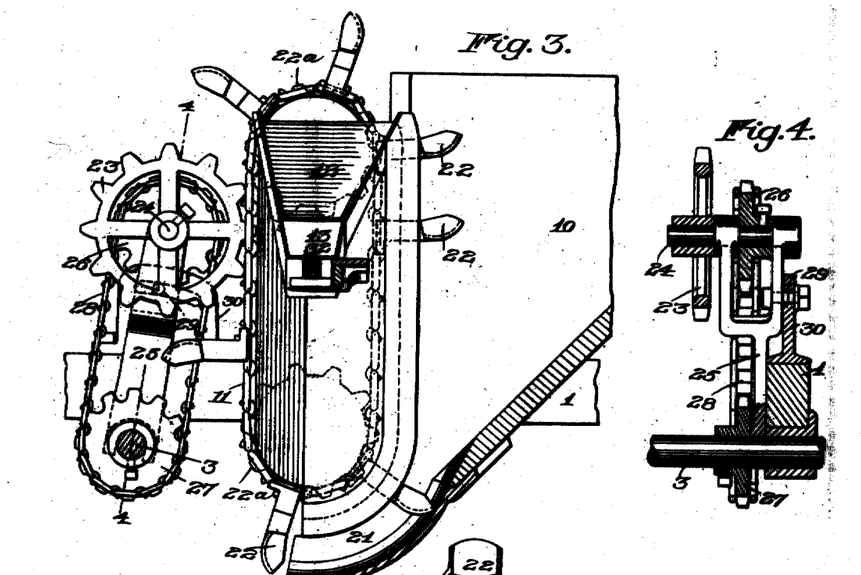
Fig. 3 is a vertical section taken substantially on the line 3—3 of Fig. 2 showing in side elevation the endless conveyer for feeding the seed from the main hopper and also its driving means.
Fig. 4 is a section through the conveyer driving mechanism taken substantially on the line 4—4 of Fig. 3.

Proceeding now with the details of the various mechanisms alluded to and referring first more particularly to Figs. 1, 2 and 3 of the drawings, the main hopper 10 is provided with a narrow opening 21 through which are adapted to pass the buckets 22 of the endless conveyer 11, the latter being mounted upon sprockets 22ª journaled on a bracket board 22ᵇ. The full set of buckets is not shown in any of the views for the reason that they would obscure other parts but suffice it to say that they may be arranged at regular distances apart on the conveyer and are of sufficient number to bring about an initial feed commensurate with the timing of the other parts. The conveyer 11 is, in the present instance, a chain conveyer and I prefer to drive it by means of a sprocket 23 carried by a shaft 24 (Fig. 4) journaled in a yoke arm 25 turning about the axle shaft 3 as a center. The sprocket itself is driven through the medium of a sprocket 26 fast on the shaft 24 by a sprocket 27 fast on the axle shaft and a connecting chain 28. The sprocket 23 meshes with the outer side of the chain 11, that is, without the loop of the conveyer and because of its being mounted on the arm 25, it can be swung toward and from the conveyer to tighten or loosen the drive or, if it is necessary to increase the initial speed, or diminish it, a larger or smaller sprocket 23 can be easily substituted. The arm 25 is held in its various positions of adjustment by a segmental slot and pin connection 29 with a bracket 30 upon the main frame 1.

Figure 5:
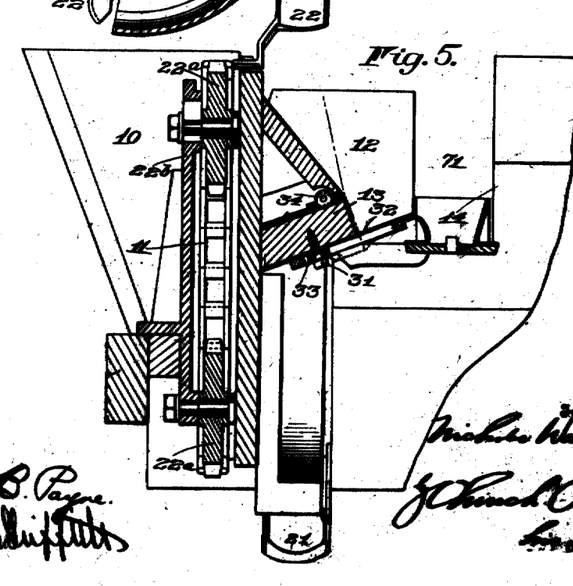
Fig. 5 is a section of the conveyer taken substantially on the line 5—5 of Fig. 2.

The buckets 22 of the conveyer are offset permitting them to discharge effectively into the auxiliary hopper 12 over which they pass and the details of the latter are perhaps best illustrated in Fig. 5. The vibrator 13 before referred to is therein shown to be a block having a pin 31 that travels in a slot 32 in the hopper bottom under the influence of a lever 33 that will be hereinafter referred to, the upward thrust of the block being received by a friction roller 34. Each vibration positively forces seed into the adjacent feed pocket 14 where it is impaled by the carrier forks that will now be described.

Figures 11, 12, 13:
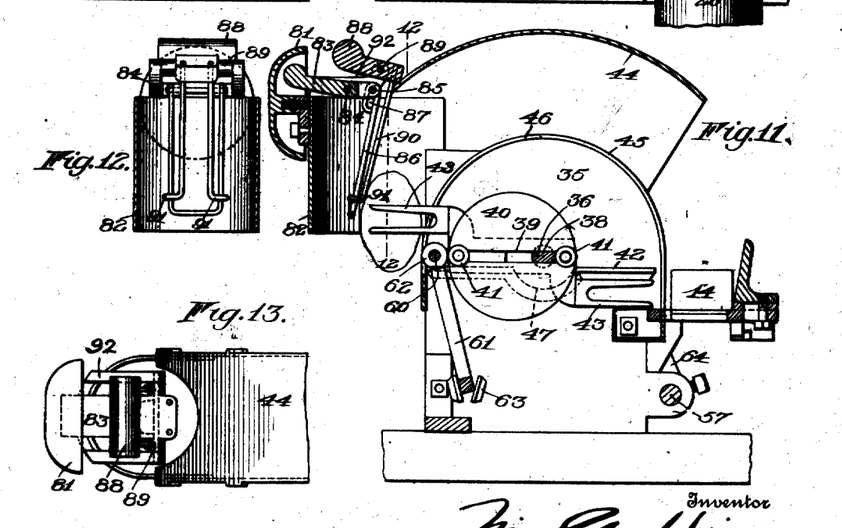

Carried on the main frame 1 is a casing or support presenting parallel spaced walls 35 within which is journaled a shaft 36, (reference now being had to Figs. 6 to 11 inclusive) in alinement with horizontal slotted ways 37. The shaft has a flat portion 38 that passes through a slot 39 in a disk 40 which latter is thus mounted to slide transversely of the shaft and to rotate therewith in an eccentric manner. The disk 40 has laterally projecting rollers 41 that travel on tracks 42 extending from the walls 35 in the direction of the pocket 14 and hold the disk steady during its transverse reciprocating movement on the shaft, the purpose of which movement is to impale the seed in the holder or pocket 14 upon one or the other of two diametrically opposed forks 43 on the disk. When the seed is impaled, the parts are in the position shown in Fig. 6 and it is at this point that a half revolution is imparted to the shaft 36 by means that will be hereinafter explained so that the seed is carried upwardly between outer and inner housing plates 44 and 45 respectively, the latter provided with a central slot 46, until the seed is in a diametrically opposite position, as shown in Fig. 11. Rotation of shaft 36 is now discontinued for another reciprocation of the rotary member 40 thereon which likewise impales a seed upon the opposite fork 43 while the first one is being ejected by reason of the retraction of the fork within the slot 46 and emptied into one of the pockets 16 of the distributer 17. During the eccentric rotation of the disk 40 and the forks carried thereby the same are held against transverse reciprocating movement by one or the other of the rollers 41 traversing an intermediate semi-circular portion 47 of the track 42 which portion is concentric with the shaft 36.

Figure 6:
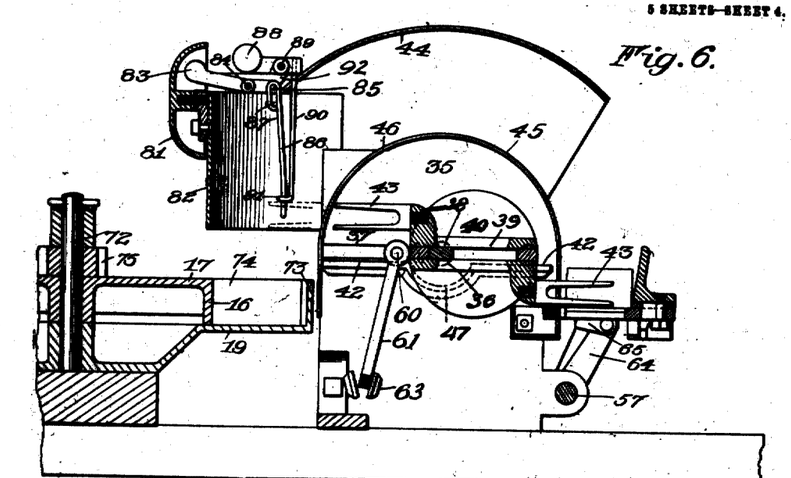
Fig. 6 is a vertical section through the carrier which transfers the seed to the distributer, the same being taken substantially on the line 6—6 of Fig. 2.
Figures 7, 8:
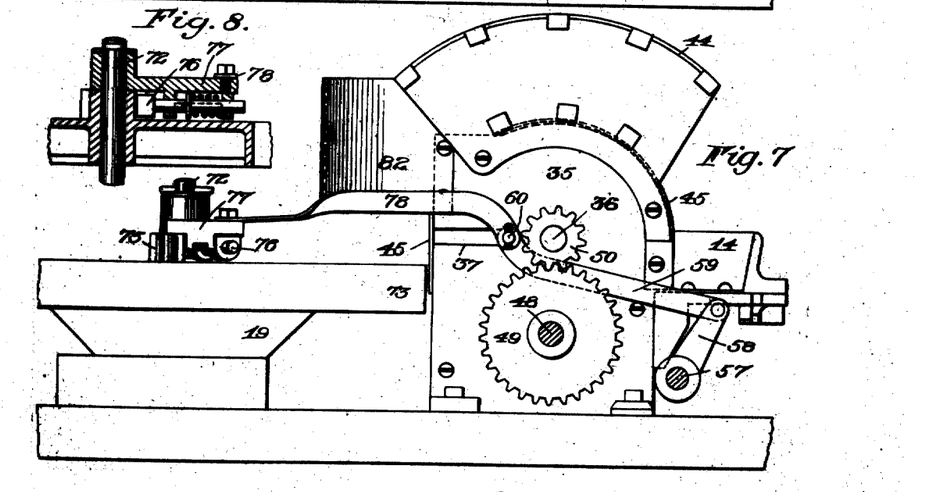
Fig. 7 is a side elevation of the same parts viewed from the right side of the machine.
Fig. 8 is a detail section of the ratchet for operating the distributer.

The means for imparting the intermittent rotary motion to the shaft 36 and the intermittent reciprocatory motion to the disk 40 sliding thereon is perhaps best shown in Figs. 1, 6 and 7 and comprises in the present instance, a short shaft 48 having a gear 49 thereon that meshes with a gear 50 on the shaft 36. On the outer end of the latter is a star wheel 51 (Fig. 1) having radial arms forming abutments 52 arranged to be engaged by a plurality of peripheral abutments on pins 53 on a wheel 54 that is mounted directly on and turns with the main axle shaft 3. The abutments 53 are so spaced that with the natural travel of the vehicle their successive engagement with the abutments 52 on the star wheel will operate the shaft 36 through the medium of the gears 49 and 50 one-half a revolution at the desired intervals to cause the reversal of the impaling forks and in order that this interval may be regulated as to length when desired, the abutments 53 are made adjustable in the apertures 55 so that a greater or less number, equally spaced, however, may be used.

After one of the abutments has parted engagement with an abutment 52 on the star wheel completing the half revolution of the carrier, it at once engages a dog 56 on a shaft 57 (Fig. 1) having an arm 58 that is connected at 60, through the slotted guides 37, with one arm of a yoke 61 located between the casing walls 35 of the carrier and provided with rollers 62 that engage the periphery of the carrier disk 40, the yoke being fulcrumed at its lower end between lugs 63 upon the casing. Another arm 64 on the shaft 57 is connected with a link 65 that is also connected to the other arm of the yoke 61 at 66 through the slotted guide 37 in the opposite casing wall. It will therefore be seen that actuation of the dog 56 as before described by the wheel 54 will, through the medium of the links 59 and 65, draw the yoke 61 along its guides and slide the carrier disk 40 transversely of the shaft 36 from the position shown in Fig. 11 to that shown in Fig. 6, effecting the before described impaling operation. After the abutment 53 leaves the dog 56, the succeeding abutment rotates the carrier shaft 36 again to transfer the impaled seed to the distributer and as the disk 40 is rotating eccentrically, it acts as a cam for returning the yoke 61 thereby resetting the dog 56 through the chain of mechanism for another operation.

Figures 9, 10:
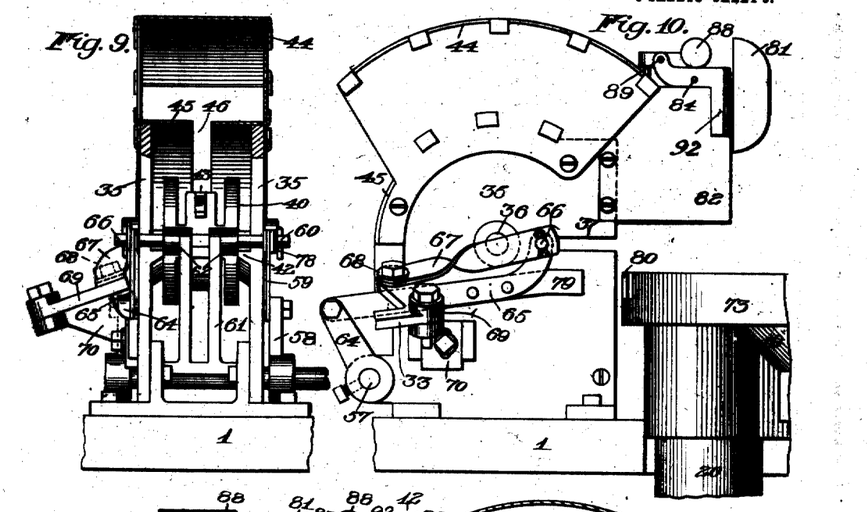
Fig. 9 is a vertical transverse section through the carrier housing showing the carrier mechanism in rear elevation.
Fig. 10 is a side elevation of the carrier mechanism taken from the left side of the machine.

Referring to Fig. 10, the point of connection 66 between the link 65 and the yoke 61 also connects the latter with a link 67 pivoted at 68 to a bell crank 69 supported on a bracket 70 on one of the casing walls 35 and the other arm 33 of this bell crank is the before described arm shown in section in Fig. 5 that is connected to the pin 31 for vibrating the block 13 in the auxiliary hopper 12. By this direct connection between the impaling movement of the carrier forks and the feeding device in the auxiliary hopper, the said feeding device (being the block 13) recedes as the fork enters the pocket 14, but with every rotary movement of the fork a seed is positively forced into the pocket 14 ready to be impaled upon the opposite fork that is just rotating into alined position for this operation.

It may be here stated that the feed or impaling pocket 14 is arranged to overflow through a cutaway portion 71 into the main hopper 10 and because of the close association of the pocket 14 and the auxiliary hopper 12, the seed is apt to spill into the former from the latter aside from being forced therein by the block 13. It is also desirable to cause the conveyer 11 to feed from the main to the auxiliary hopper at a slightly faster rate than the transferring capacity of the carrier forks 43 from the pocket 14. The result is that there is not only always a seed in the pocket 14 but usually some to spare so that the impaling forks are sure to be supplied and too great a supply in the pocket 14 will readily overflow back into the main hopper 10. The utility of the auxiliary hopper 12 will be better understood if it is noted that the vibrator 13 is not working under and interfered with by the weight of the entire supply of seed being carried by the vehicle but under only enough to insure the performance of its function.

Returning now to the distributer 17 (Figs. 1, 2 and 6) it is journaled in the present instance on a spindle 72 on the table 19 having a rim 73 and embodies radial sweeps 74 that constitute the pockets 16, the bottoms of which are formed by the table itself. The pocket that receives the seed from the fork is at that time next to the one which is over the discharge opening 18 in the table so that each pocket is filled immediately after being emptied and then travels a complete revolution before being emptied again giving the attendant sufficient opportunity to see that no skippages have occurred. The distributer must of course halt when the seed is being deposited therein and its intermittent rotary motion is therefore obtained by means of a ratchet wheel 75 fast thereon that is engaged by a spring operated pinion 76 (Fig. 8) carried on an arm 77 that is also journaled on the spindle 72. Connected with this arm is a link 78 (Figs. 1 and 7) that is pivoted at the point 60 connecting the link 59 with the carrier reciprocating yoke 61. By this arrangement the distributer is rotated the distance of one pocket each time the yoke 61 is returned by the cam action of the carrier disk 40 which is the movement that brings the freshly impaled seed toward the distributer.

As any motion of the distributer while the seed is being ejected from the fork therein would be apt to cause damage to the machine, I provide a projection 79 on the link 65 (Fig. 10) that engages within an opening 80 in the rim 73 of the table 19 with the movement of the impaled seed toward the distributer and by its engagement with the sweeps 74, prevents rotation of the distributer 17 through any cause, the projection being withdrawn with the impaling movement of the carrier in time to allow the rotary movement of the distributer.

As an additional precaution against allowing one of the pockets 16 of the distributer to reach the discharge opening 18 in an empty condition, I provide a signal device that warns the operator of the fact whenever one of the impaling forks rotates toward the distributer pocket without having a seed thereon. This signal device is provided in the present instance in the form of an alarm bell 81 mounted on a tubular bracket 82 that forms a continuation of the ejector passage 44—45 and having a clapper 83 pivoted at 84 (Figs. 11, 12 and 13). To the other arm of the clapper is pivoted at 85 an actuating member or trigger 86 which has a slotted connection 87 with the pivot 85 to give it a free contact with the bell. The actuator is in the present instance in the form of a wire loop that depends under gravity control into the rotary path of the forks 43, the loop being of sufficient proportions to permit of the entrance and engagement of the forks therein when bare but insufficient to accommodate a seed carried on one of the forks. When the fork arrives empty, therefore, it exerts a longitudinal pull on the actuator and trips the bell clapper, but when a seed engages therewith, the actuator is displaced laterally, swinging on its pivot as shown in Fig. 11 and the bell clapper remains at rest.

The position of the signal actuator or trigger 86 in the path of the forks is controlled by gravity and to provide against its swinging out of said path by reason of the operation of the machine upon hilly ground, or otherwise, I provide a compensating device in the present form of a counterweight 88 pivoted at 89 on a different center from the clapper or its actuator but provided with arms 90 having loops 91 arranged in sliding engagement with the depending loop 86, movement of the counterweight in one direction being limited by its engagement with the pivot supporting bracket 92 and in the other by contact of the lower end of the actuator with the walls of the tubular brackets 82. The weights in this way may be easily distributed so that with any working inclination of the planter the actuator 86 will still be maintained perpendicularly in the path of the forks without the counterweight being so heavy as to interfere with the deflection thereof under the engagement of a seed on one of the forks.

I claim as my invention:

1. In a planter, the combination with a hopper and an endless conveyer for distributing the contents thereof having offset buckets thereon, of means for driving the conveyer operatively coöperating therewith on the outer side thereof to one side of the path of the buckets.

2. In a planter, the combination with a hopper and an endless conveyer for distributing the contents thereof having offset buckets thereon, of means for driving the conveyer comprising a wheel operatively coöperating therewith on the outer side thereof and arranged in the plane of the conveyer.

3. In a planter, the combination with a hopper and an endless conveyer for distributing the contents thereof, of means for driving the conveyer comprising a wheel operatively coöperating therewith on the outer side thereof, said wheel being mounted in bearings movable toward and from the conveyer to operate the wheel into and out of engagement therewith.

4. In a planter, the combination with a hopper and an endless chain conveyer for distributing the contents thereof, of means for driving the conveyer comprising a driving shaft, an arm loosely mounted thereon to swing toward and from the conveyer, a sprocket wheel on the arm meshing with the chain conveyer on the outer side thereof and driving connections between the shaft and sprocket.

5. In a planter, the combination with a hopper, of an endless conveyer operating in a vertical plane and having a plurality of buckets offset to one side of the plane of the conveyer thereon arranged to receive the contents of the hopper and a receiving receptacle arranged at one side of the plane of the conveyer within the plane of movement of the buckets and within which the latter are adapted to empty.

6. In a planter, the combination with a main hopper, of an auxiliary hopper, means for conveying seed at a predetermined rate from the former to the latter, a receiving pocket fed from the auxiliary hopper and a carrier for transferring the seed from the receiving pocket and depositing them at intervals.

7. In a planter, the combination with a main hopper, of an auxiliary hopper, means for conveying seed at a predetermined rate from the former to the latter, a receiving pocket, means for forcing seed from the auxiliary hopper into the receiving pocket and a carrier for removing the seed from the receiving pocket at a less rate than they are being conveyed from one hopper to the other and depositing them at intervals.

8. In a planter, the combination with a main hopper, of an auxiliary hopper, means for conveying seed at a predetermined rate from the former to the latter, and means for forcing seed from the auxiliary hopper embodying a vibrating member operating within said hopper in timed relation to the conveying means.

9. In a planter, the combination with a main hopper, of an auxiliary hopper, means for conveying seed at a predetermined rate from the former to the latter, a receiving holder arranged to overflow into the main hopper, means for forcing seed from the auxiliary hopper into the receiving holder and a carrier for removing the seed from the receiving holder at less rate than they are being conveyed from one hopper to the other and depositing them at intervals.

10. In a planter, the combination with a main hopper, of an auxiliary hopper, means for conveying seed at a predetermined rate from the former to the latter, a receiving holder arranged to overflow into the main hopper, means for forcing seed from the auxiliary hopper into the receiving holder and a carrier fork for impaling the seed and removing the seed one by one from the receiving holder at less rate than they are being conveyed from one hopper to the other and depositing them at intervals.

11. In a planter, the combination with a hopper, of a receiving holder arranged to overflow into the hopper, means for feeding seed from the hopper to the receiving holder and a device for removing the seed from the latter and depositing them at intervals.

12. In a planter, the combination with a hopper, of a receiving holder arranged to overflow into the hopper, means for feeding seed at a predetermined rate from the hopper to the holder and a device for removing the seed from the holder at a lower rate than it is being fed from the hopper and depositing it at intervals.

13. In a planter, the combination with a seed holder, of a carrier for removing seed therefrom and depositing it at intervals comprising a supporting case, a shaft, a track having a straight portion extending in the direction of the holder and an intermediate semi-circular portion concentric with the shaft, a member rotatable with and slidable transversely of the shaft on the track, diametrically opposed impaling forks on the rotatable member, means for reciprocating the latter transversely of and eccentrically to the shaft to impale the seed on one fork, means for ejecting a seed from the opposite fork, means for imparting a half revolution to the shaft to reverse the positions of the forks, and track engaging portions on the rotatable member adapted to traverse the semi-circular portion of the track and hold the rotatable member against transverse movement on the shaft during the said half revolution of the latter.

14. In a planter, the combination with a seed holder, of a carrier for removing seeds therefrom and depositing them at intervals comprising a shaft, diametrically opposed impaling forks thereon adapted to rotate with the shaft and to reciprocate transversely thereof to impale the seeds in the holder, and means for imparting intermittent rotary motion to the shaft consisting of an actuator having a series of spaced abutments thereon and a driving member arranged to engage the same, a member for reciprocating the forks in one direction, an actuating device for said member operated by the driving member and a cam for resetting the reciprocating member and its actuator by engagement with the former during the rotation of the shaft.

15. In a planter, the combination with a seed holder, of a carrier for removing seeds therefrom and depositing them at intervals comprising a shaft, a disk having diametrically opposed impaling forks thereon and adapted to rotate with the shaft and to reciprocate transversely and eccentrically thereof to impale the seeds in the holder, means for imparting intermittent rotary motion to the shaft consisting of an actuator having a series of spaced abutments thereon and a driving member arranged to engage the same, a member for reciprocating the disk while the shaft is at rest, said member being returned by the eccentric rotation of the disk with the shaft, and an actuating device for said member operated by the driving member between the intermittent rotary movements of the shaft.

16. In a planter, the combination with a seed holder, of a carrier for removing seeds therefrom and depositing them at intervals comprising a shaft, diametrically opposed impaling forks thereon adapted to rotate with the shaft and to reciprocate transversely thereof to impale the seeds in the holder, means for imparting intermittent rotary motion to the shaft, consisting of an actuating wheel having a series of spaced abutments thereon, and a driving wheel having a series of spaced abutments thereon arranged to successively engage those on the actuator, a member for reciprocating the forks in one direction, an actuating device for said member operated by the abutments on the driving member after the same have engaged the shaft actuating wheel and means for resetting the fork reciprocating member and its actuator during rotation of the shaft.

17. In a planter, the combination with a main frame, an axle shaft ground wheels on the latter and a seed holder, of a carrier for removing seeds from the latter and depositing them at intervals comprising a shaft driven by the axle shaft, diametrically opposed impaling forks thereon adapted to rotate with the shaft and to reciprocate transversely thereof to impale the seeds in the holder, means for imparting intermittent rotary motion to the shaft consisting of an actuating wheel movable therewith having a series of spaced abutments thereon and a driving wheel on the axle shaft having a series of spaced abutments arranged to successively engage those on the actuator, a member for reciprocating the forks in one direction, an actuating device for said member comprising a rock shaft eccentrically connected therewith and having a dog thereon rocked by the abutments on the driving member after the same has engaged the shaft actuating wheel and means for resetting the fork reciprocating member and its actuating dog while the shaft is rotating.

18. In a planter, the combination with a hopper and a seed holder fed therefrom, of a carrier for removing the seed from the holder and depositing them at intervals comprising a pair of intermittently rotating forks also adapted to reciprocate toward and from the holder to impale the seed thereon, means for reciprocating the forks and a vibrator in the hopper connected with and driven by said operating means to force a seed into the holder in advance of the impaling movement of the forks.

19. In a planter, the combination with a traveling distributer, of a carrier having a fork thereon for depositing seed on the distributer in successive arrangement, each deposit being isolated from the others, a signal operated by the fork when empty during its travel toward the distributer and means for discharging the deposits from the latter in the order in which they are delivered from the carrier.

20. In a planter, the combination with a table and a rotary distributer on the table having a plurality of peripheral pockets, the table constituting the bottoms of the latter and being provided with a discharge opening in the path of the pockets, of a carrier for depositing seed in one pocket while the one immediately succeeding it is discharging through the opening in the table, each seed being carried through a complete revolution of the distributer before being discharged through the opening.

21. In a planter, the combination with an intermittently traveling distributer having a plurality of pockets, of a carrier for depositing seed in the pockets, successively, at each halt of the distributer, means for discharging the contents of the pockets in the order in which they are filled and means for locking the distributer against movement while the seed is deposited by the carrier.

22. In a planter, the combination with a rotary distributer having a plurality of pockets, of a reciprocating carrier for depositing seed in each pocket successively, means for discharging the pockets in the order in which they are filled, an actuator for the carrier and a pawl and ratchet for imparting intermittent movement to the distributer connected for movement with the actuator.

23. In a planter, the combination with a carrier for depositing the seed at intervals embodying a fork having impaling and ejecting positions, of a signal operated by the empty fork during its movement from the impaling to the ejecting position.

24. In a planter, the combination with a carrier for depositing the seed at intervals embodying a fork having impaling and ejecting positions, of a signal and an actuating device therefor operated by the empty fork during its movement to the ejecting position, said actuating device being arranged to yield from the path of the fork when engaged by a seed carried on the latter.

25. In a planter, the combination with a carrier for depositing the seed at intervals embodying a movable fork having impaling and ejecting positions, of a signal and an actuating device therefor operated by the empty fork during its movement to the ejecting position, said actuating device being arranged to yield from the path of the fork when engaged by a seed carried on the latter and means for normally maintaining the actuator in the path of the fork.

26. In a planter, the combination with a carrier for depositing the seed at intervals embodying a movable fork having impaling and ejecting positions, of a signal, an actuating device therefor embodying a depending gravity controlled trigger engaged and moved longitudinally by the empty fork during its movement to the ejecting position, said trigger being arranged to yield laterally from the path of the fork when engaged by a seed carried on the latter, and means for normally maintaining the actuator in the path of the fork.

27. In a planter, the combination with a carrier for depositing the seed at intervals embodying a movable fork having impaling and ejecting positions, of a signal, an actuating device therefor embodying a depending gravity controlled trigger engaged and moved longitudinally by the empty fork during its movement to the ejecting position, said trigger being arranged to yield laterally from the path of the fork when engaged by a seed carried on the latter, a pivoted counterweight having a limited movement and sliding connections between the latter and the actuating trigger for normally maintaining the latter in the path of the fork.

NICHOLAS WARING.

Witnesses:
 RUSSELL B. GRIFFITH,
 LUCY A. VAN COURT.